United States Patent Office 3,311,656
Patented Mar. 28, 1967

3,311,656
INTERMEDIATES FOR THE PREPARATION
OF A CAROTENOID
Joseph Donald Surmatis, West Caldwell, N.J., assignor
to Hoffmann-La Roche Inc., Nutley, N.J., a corporation of New Jersey
No Drawing. Filed May 12, 1964, Ser. No. 366,881
7 Claims. (Cl. 260—488)

The present invention relates to processes for the preparation of trans-canthaxanthin and more particularly relates to processes and intermediates for the prepartaion of trans-canthaxanthin from retinene.

Trans-canthaxanthin is a known compound useful as a coloring agent in the food and pharmaceutical industries.

Relatively simple synthetic procedures for making trans-canthaxanthin in relatively good yield have now been discovered. The instant processes are carried out according to the following reaction scheme, wherein R is a straight or branched chain alkyl group having from 1 to 6 carbon atoms, preferably methyl, and $A^\ominus$ is the anion of a mineral acid, e.g., $Cl^\ominus$, $Br^\ominus$, $I^\ominus$, $HSO_4^\ominus$, etc.

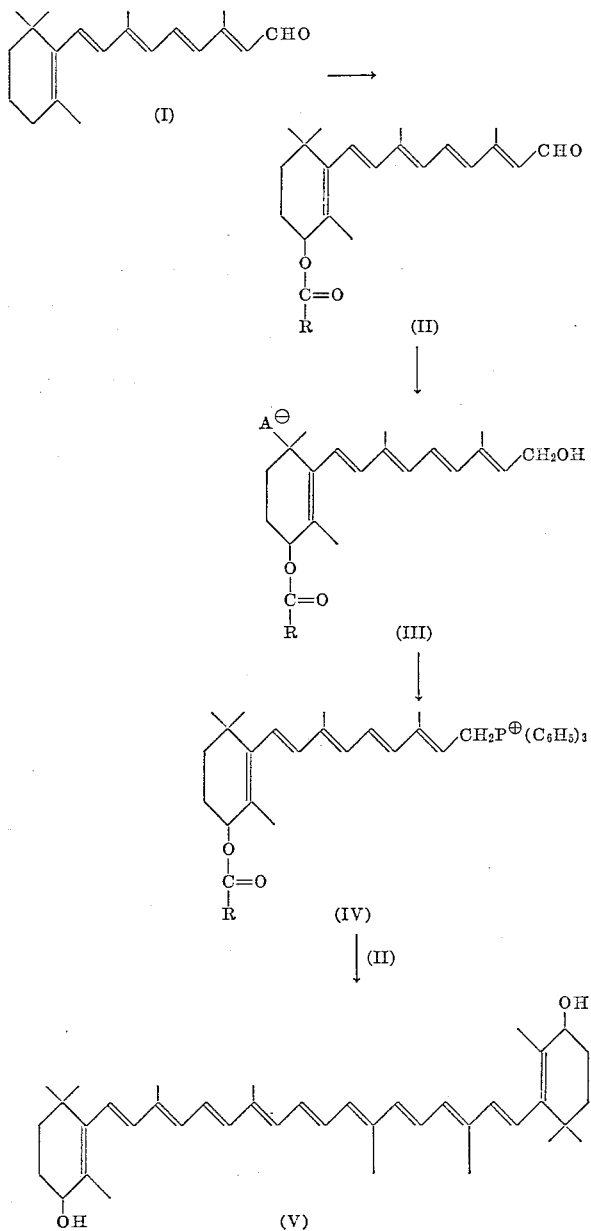

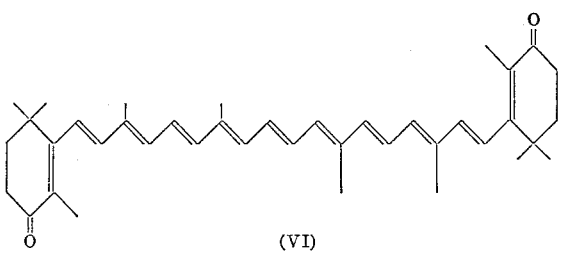

(a) Retinene (I), which is another name for vitamin A aldehyde, is reacted with N-bromo-succinimide and a lower alkanoic acid, e.g., acetic acid, propionic acid, butyric acid, diethyl-acetic acid, etc., preferably acetic acid, to form a 3-lower alkanoyloxyretinene (II). This step is carried out in an organic solvent substantially inert to the reactants, preferably chloroform. The reaction temperature is preferably in the range of about —40° to about +15° C., most preferably from about —10° to about +5° C. When commercial chloroform is used as solvent, it is advantageous to heat the chloroform with a lower alkanoic acid anhydride to remove any water and alcohols that may be present.

(b) The 3-lower alkanoyloxyretinene is treated with a group I metal borohydride, e.g., sodium borohydride, potassium borohydride, etc., to form 3-lower alkanoyloxy vitamin A alcohol (III). The reaction is preferably carried out in an organic solvent substantially inert to the reactants, e.g., a lower alkanol solvent, e.g., methanol, ethanol, etc., preferably methanol, dimethylformamide, etc. The reduction product of the reaction between the 3-lower alkanoyloxyretinene and the group I metal borohydride is treated with an aqueous strong acid, preferably dilute sulfuric acid, to form the 3-lower alkanoyloxy vitamin A alcohol.

(c) The 3-lower alkanoyloxy vitamin A alcohol is treated with triphenylphosphine and a mineral acid, e.g., HCl, HBr, $H_2SO_4$, etc., to form a 3-lower alkanoyloxy-retinyl triphenylphosphonium salt (IV). When a combination of an alkali metal iodide, e.g., sodium or potassium iodide, is employed with HCl or HBr, the salt is the iodide salt. The reaction of the 3-lower alkanoyloxy vitamin A alcohol with triphenylphosphine and a mineral acid is preferably carried out in an organic solvent substantially inert to the reactants, e.g., a lower alkanol, preferably methanol.

(d) The triphenylphosphonium salt (IV) is reacted with 3-lower alkanoyloxyretinene (II) in the presence of either (a) an alkali metal lower alkoxide, preferably sodium methoxide, or (b) a solution of an alkali metal hydroxide in a lower alkanol, e.g., KOH in methanol. The reaction with the alkali metal lower alkoxide is preferably carried out in the presence of an organic solvent substantially inert to the reactants, e.g., a lower alkanol, preferably methanol. The crude reaction product is a mixture of cis and trans-isozeaxanthin.

(e) The cis form is transformed by isomerization into the trans form by heating the mixture of cis and trans-isozeaxanthin in an inert solvent, preferably a hydrocarbon solvent, e.g., heptane.

(f) The trans-isozeaxanthin is treated with aluminum isopropoxide and acetone. The reaction is carried out in an organic solvent substantially inert to the reactants, e.g., benzene, toluene, cyclohexane, etc., or in excess acetone. The reaction product is then treated with aqueous acid, preferably dilute sulfuric acid, to form trans-canthaxanthin.

Alternatively, the above reaction scheme can be carried out except that compound II is converted to compound V via the following reaction scheme, wherein R and A⊖ have the same meaning as before:

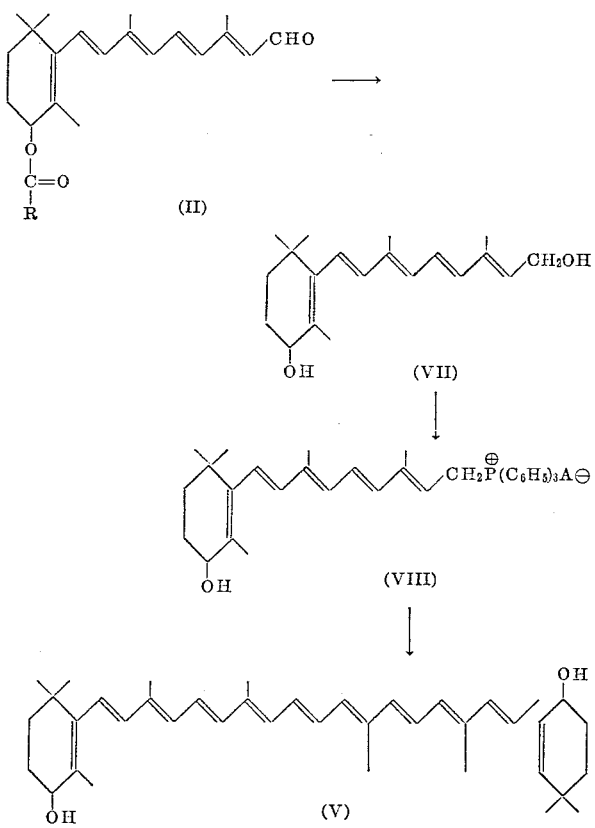

In this process variant, compound II is reduced with either (a) a group I metal-aluminum hydride, e.g., lithium aluminum hydride in a solvent substantially inert to the reactants, e.g., an ether such as diethyl ether, or an ether-benzene mixture, or (b) aluminum isopropoxide in isopropyl alcohol. The reduction product of the above reaction is treated with an aqueous strong acid, preferably dilute sulfuric acid, to form 3-hydroxy vitamin A alcohol (VII). The 3-hydroxy vitamin A alcohol (VII) is then treated with triphenylphosphine to form a 3-hydroxyretinyl triphenylphosphonium salt (VIII) according to the process of step (c) above. Also, the reaction of the phosphonium salt (VIII) with 3-lower alkanoyloxyretinene (II) to form trans-isozeaxanthin (V) is carried out according to the process of step (d) above.

The invention will be better understood by referring to the following examples which are given for illustrative purposes only and are not meant to limit the invention.

EXAMPLE 1

*Preparation of 3-acetoxyretinene (3-acetoxy vitamin A aldehyde) (II)*

Chloroform (500 ml.), acetic acid (70 ml.), and acetic anhydride (10 ml.), were placed in a 2-liter flask and refluxed for one hour. The heat was removed and the solution in the flask was cooled to −18°.

Vitamin A aldehyde (retinene) (28.4 g.) and N-bromosuccinimide (24 g.) were added to the flask with vigorous stirring in the order named. The cold bath was removed and the reaction mixture was stirred under an atmosphere of nitrogen for 10 minutes. This caused the temperature to rise to 2°. Dimethylaniline (80 ml.) was added and the stirring was continued for two hours, while the temperature was allowed to rise to 20°. Pyridine (25 ml.) was added and the stirring was continued for an additional one hour.

The reaction was transferred to a separator and washed three times with 1000 ml. of cold 5 percent sulfuric acid, then with 1000 ml. of water, 500 ml. of saturated sodium bicarbonate solution, and finally with 1000 ml. of water. On removal of the solvent under reduced pressure, there resulted 40 g. of 3-acetoxyretinene.

EXAMPLE 2

*Preparation of 3-acetoxy vitamin A alcohol (III)*

The 3-acetoxyretinene, obtained in Example 1, was dissolved in methanol (400 ml.) and added by means of a dropping funnel to a cold (−10°) solution of sodium borohydride (6.0 g.) in methanol (400 ml.). The addition required two hours. The cold bath was removed and the stirring was continued for two hours.

The reaction was poured into a cold (10°) 1 percent solution of sulfuric acid (2000 ml.) while stirring, and extracted with hexane. This hexane extract was water-washed and dried over sodium sulfate. On removal of the solvent under vacuum, 3-acetoxy vitamin A alcohol was obtained as a thick orange-colored syrup (29.5 g.).

EXAMPLE 3

*Preparation of 3-acetoxyretinyl triphenylphosphonium chloride (IV)*

34.4 g. of 3-acetoxy vitamin A alcohol prepared according to Example 2 was dissolved in 300 ml. of methanol. To this there was added 40 g. of triphenylphosphine. 40 ml. of methanolic HCl (172 mg. anhydrous HCl/ml.) was charged to a dropping funnel and added to the stirred reaction mixture at 15–20° in one hour. The reaction was stirred under an atmosphere of nitrogen for 20 hours. The reaction mixture was used for the next step without purification.

EXAMPLE 4

*Preparation of trans-isozeaxanthin (V)*

The reaction mixture prepared in Example 3 was placed in a 2-liter flask fitted with two dropping funnels. A freshly prepared solution of sodium methoxide (prepared by dissolving 5 g. of a metallic sodium in 100 ml. of methanol) was charged to one funnel while 35 g. of 3-acetoxyretinene (prepared in Example 1) was dissolved in 300 ml. of isopropyl alcohol and charged to the second dropping funnel. Addition of the contents from both dropping funnels was made simultaneously over a period of two hours while stirring the contents of the flask under an atmosphere of nitrogen. Stirring was then continued overnight (18 hours).

On the following morning, potassium hydroxide (15 g.) dissolved in methanol (200 ml.) was added to the reaction mixture and the stirring continued for an additional four hours. The reaction flask was cooled overnight in a refrigerator and the red solid was filtered by suction.

The red solid, a crude mixture of cis and trans-isozeaxanthin, was placed in a flask with 200 ml. of heptane and the solvent was distilled off while stirring until a loose paste was obtained. The condenser was then fixed for reflux and the product was stirred at reflux temperature for 12 hours. The product in the flask was diluted with 100 cc. of heptane, cooled to room temperature and filtered to give trans-isozeaxanthin as a bright red crystalline solid.

EXAMPLE 5

*Preparation of trans-canthaxanthin (VI)*

Trans-isozeaxanthin (50 g.) prepared according to Example 4 was dissolved in 500 ml. of benzene and 1000 ml. of acetone. Aluminum isopropoxide (100 g.) was weighed out into the reaction flask and the contents were stirred overnight (16 hours) at reflux temperature under an atmosphere of nitrogen.

On the following day, the solution was poured into a separator containing 2000 ml. of 5 percent sulfuric acid and extracted with benzene. The combined benzene extracts were washed with water, saturated sodium bicarbonate solution, and again with water. The washed benzene solution was concentrated under vacuum to a syrup which partially crystallized. The product was dissolved in methylene chloride, filtered, and diluted with an equal volume of denatured alcohol. The methylene chloride was distilled until crystallization started. The contents of the flask were cooled overnight at 0° and filtered. Trans-canthaxanthin was obtained as a violet-colored crystalline solid. On recrystallization from methylene chloride pure trans-canthaxanthin was obtained melting at 217°.

$E_{1cm.}^{1 percent}$ 2250 at 470 mµ (in cyclohexane)

I claim:
1. 3-lower alkanoyloxy vitamin A alcohol.
2. 3-acetoxy vitamin A alcohol.
3. 3-hydroxy vitamin A alcohol.
4. 3-lower alkanoyloxyretinyl triphenylphosphonium mineral acid salt.
5. 3-acetoxyretinyl triphenylphosphonium chloride.
6. 3-hydroxyretinyl triphenylphosphonium mineral acid salt.
7. 3-hydroxyretinyl triphenylphosphonium chloride.

References Cited by the Examiner
UNITED STATES PATENTS

| | | | |
|---|---|---|---|
| 2,676,988 | 4/1954 | Robeson et al. | 260—586 |
| 2,870,197 | 1/1959 | Isler et al. | 260—586 |
| 3,033,897 | 5/1962 | Robeson | 260—586 |

OTHER REFERENCES

Raphael et al.: Advances in Organic Chemistry, 1963, vol. 4, pages 182, 187, 200–201 and 208.

Menbest et al.: J. Chem. Soc. (London), 1957, p. 4909.

LORRAINE A. WEINBERGER, *Primary Examiner.*

VIVIAN GARNER, *Assistant Examiner.*

UNITED STATES PATENT OFFICE
CERTIFICATE OF CORRECTION

Patent No. 3,311,656                                    March 28, 1967

Joseph Donald Surmatis

It is certified that error appears in the above identified patent and that said Letters Patent are hereby corrected as shown below:

Column 3, lines 30 to 37, the formula should appear as show below:

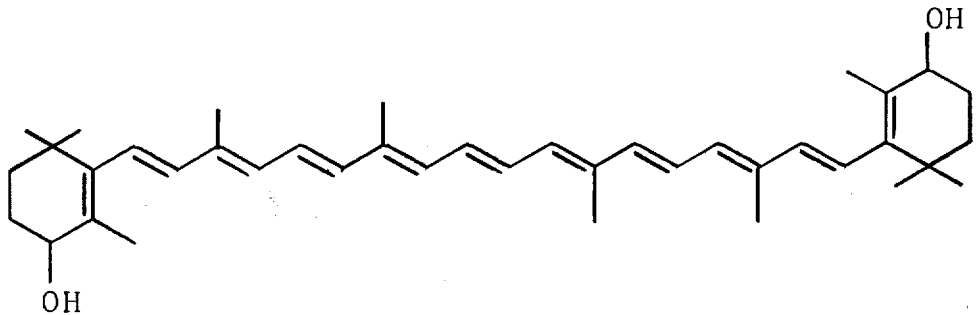

Column 4, line 42, "of a metallic" should read -- of metallic --
Column 6, line 15, "Menbest et al." should read -- Henbest et al. --.

Signed and sealed this 3rd day of February 1970.

(SEAL)
Attest:

EDWARD M. FLETCHER, JR.                        WILLIAM E. SCHUYLER, JR.
Attesting Officer                                    Commissioner of Patents